SWEATT & HUNTOON.
Bake Pan.

No. 111,012. Patented Jan. 17, 1871.

United States Patent Office.

CHARLES L. SWEATT AND GEORGE A. HUNTOON, OF FISHERSVILLE, NEW HAMPSHIRE.

Letters Patent No. 111,012, dated January 17, 1871.

IMPROVEMENT IN CUSTARD AND CAKE-BAKERS.

The Schedule referred to in these Letters Patent and making part of the same.

*To all whom it may concern:*

Be it known that we, CHARLES L. SWEATT and GEORGE A. HUNTOON, of Fishersville, in the county of Merrimack and State of New Hampshire, have invented a new and improved Custard and Cake-Baker; and we hereby declare the following to be a full, clear, and exact description of the same, reference being had to the accompanying drawing making a part of this specification, in which—

Figure 1:
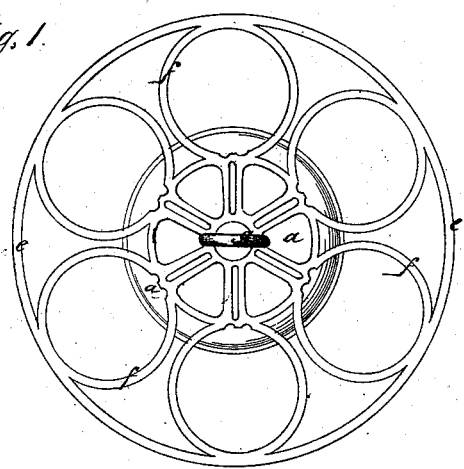
Figure 2:
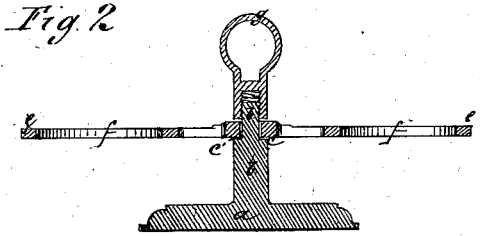

Figure 1 is a top view, and
Figure 2 is a vertical section.

This invention consists of a stand and an annular rim provided with internal rings, said rim being fitted loosely upon the stem of the stand near its top, and held in place by a handle, which screws upon the stem, as will hereinafter more fully appear.

In the drawing—
$a$ is the stand.
$b$, its stem.
$c$, the shoulder on the stem $b$, on which the annular rim $e$, provided with the internal rings $f$, rest.

The rings $f$, in which the cups containing custard, drop-cake, or any other article to be baked, are placed, may consist of any number from three to twelve.

The handle $g$ is provided with a female-screw at its bottom, which receives a male-screw on the end of the stem $b$.

The rim $e$ fits loosely on the stem $b$, that it may be revolved to submit the cups to greater or lesser heat should the heat in the oven vary.

Having thus described our invention,
What we claim as new, and desire to secure by Letters Patent, is the following—

As a new article of manufacture, a custard and cake-baker, consisting of the stand $a$, having the stem $b$, the annular rim $e$, provided with the rings $f$ and the handle $g$, all arranged and operating in the manner set forth.

CHARLES L. SWEATT,
GEORGE A. HUNTOON.

Witnesses:
L. D. STEVENS,
B. A. KIMBALL.